US008467076B2

(12) United States Patent
Ishimoto

(10) Patent No.: US 8,467,076 B2
(45) Date of Patent: Jun. 18, 2013

(54) ADMINISTRATION DEVICE FOR ADMINISTERING DEVICES BY ACQUIRING OBJECT INFORMATION THEREFROM

(75) Inventor: Kan Ishimoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 548 days.

(21) Appl. No.: 12/725,791

(22) Filed: Mar. 17, 2010

(65) Prior Publication Data

US 2010/0328696 A1     Dec. 30, 2010

(30) Foreign Application Priority Data

Jun. 24, 2009 (JP) ................................ 2009-149922

(51) Int. Cl.
*G06F 3/12* (2006.01)
(52) U.S. Cl.
USPC ...................................... 358/1.13; 358/1.15
(58) Field of Classification Search
USPC ................. 358/1.1, 1.15, 400, 401, 434, 442, 358/468, 1.13
See application file for complete search history.

(56) References Cited

U.S. PATENT DOCUMENTS 6,718,378 B1    4/2004  Machida
8,169,637 B2 *  5/2012  Matsumoto et al. ......... 358/1.15
2006/0129664 A1  6/2006  Reimert et al.
2008/0307443 A1* 12/2008  Kato ............................. 719/321
2010/0315670 A1* 12/2010  Kojima ........................ 358/1.15

FOREIGN PATENT DOCUMENTS

| CN | 101170468 A | 4/2008 |
| JP | 2000-183877 A | 6/2000 |
| JP | 2000-322364 A | 11/2000 |
| JP | 2007-157074 A | 6/2007 |
| JP | 2008-283542 A | 11/2008 |

OTHER PUBLICATIONS

Extended European Search Report dated Sep. 30, 2010.
Chinese Official Action dated Sep. 29, 2012 from related application CN 201010150501.X.

* cited by examiner

*Primary Examiner* — Thomas D Lee
(74) *Attorney, Agent, or Firm* — Scully, Scott, Murphy & Presser, P.C.

(57) ABSTRACT

An administration device comprising a first acquisition unit and a second acquisition unit is presented. The first acquisition unit sequentially acquires an M1 type of object information from a first device by sequentially making requests to the first device for N1 types of object information, which includes the M1 type of object information. The second acquisition unit newly acquires the M1 type of object information from the first device by making a request to the first device for the M1 type of object information, without sequentially making requests to the first device. When the model information of the second device matches that of the first device, the second acquisition unit acquires the M1 type of object information from the second device by making a request to the second device for the M1 type of object information, without sequentially making requests to the second device.

9 Claims, 10 Drawing Sheets

FIG. 3

Object Information Table 32

| Node Name (138) | MAC Address (140) | IP Address (142) | Model (144) | Ver. (146) | First Type (Print Pages) (150) | Second Type (Remaining Ink) (152) | Third Type (Remaining Toner) (154) | Fourth Type (Remaining Paper) (156) |
|---|---|---|---|---|---|---|---|---|
| P001 (132) | M1 | A1 | T1 | 1.00 | 1024 | — | 23 | 32 |
| P002 (134) | M2 | A2 | T2 | 2.01 | 210 | 60 | — | — |
| P003 (136) | M3 | A3 | T1 | 1.00 | 112 | — | 88 | 435 |
| ... | ... | ... | ... | ... | ... | ... | ... | ... |

ADMINISTRATION DEVICE FOR ADMINISTERING DEVICES BY ACQUIRING OBJECT INFORMATION THEREFROM

CROSS-REFERENCE TO RELATED APPLICATIONS

This application claims priority to Japanese Patent Application No. 2009-149922, filed on Jun. 24, 2009, the contents of which are hereby incorporated by reference into the present application.

TECHNICAL FIELD

The present specification discloses an administration device that acquires information from each of a plurality of devices.

DESCRIPTION OF THE RELATED ART

A system which administers a plurality of devices on a network by an administration device is known. In this system, the administration device sequentially makes requests to a newly discovered first device on the network for all types of information that the administration device is capable of making requests. The first device sends, to the administration device, only specific types of object information to which the first device is capable of responding. The administration device stores type information indicating the specific types which can be acquired from the first device. When the administration device again needs to make requests for object information to the first device at later occasions, the administration device makes requests only for the specific types of object information.

SUMMARY

In a case where a second device equivalent to the first device is newly discovered, the above administration device sequentially makes requests to the second device for all the types of information as well. When the administration device administers a plurality of devices, it is difficult to efficiently make requests to each device for the object information. More specifically, the above administration device has a problem of making unnecessary requests to the second device. A technique is taught in the present specification that restricts the execution of such unnecessary requests.

One aspect of techniques disclosed in the present specification is an administration device. The administration device may be connected in a communicable manner with a first device and a second device. The administration device may comprise a first acquisition unit and a second acquisition unit.

The first acquisition unit may be configured to sequentially acquire an M1 type of object information from the first device by sequentially making requests to the first device for N1 types of object information. The M1 type of object information may be a part of the N1 types of object information, where the N1 is an integer equal to or greater than 2, and the M1 is an integer equal to or greater than 1 and is less than the N1.

The second acquisition unit may be configured to newly acquire the M1 types of object information from the first device, after the first acquisition unit has sequentially acquired the M1 type of object information, by making a request to the second device for the M1 type of object information that can be acquired from the first device without sequentially making requests to the second device for the N1 types of object information. In a first case where the second device is a device equivalent to the first device, the second acquisition unit may further acquire the M1 type of object information from the second device by making a request to the second device for the M1 types of object information that can be acquired from the first device without sequentially making requests to the second device for the N1 types of object information.

A control method and a computer program for realizing the administration device as disclosed herein are novel and have utility. Further, a computer readable medium including the computer program is also novel and has utility. Further, a system comprising the administration device, the first device, and the second device as disclosed herein is also novel and has utility.

BRIEF DESCRIPTION OF THE DRAWINGS

FIG. 3 shows an example of an object information table.

DETAILED DESCRIPTION OF THE PREFERRED EMBODIMENT

First Embodiment (Configuration of System)

Figure 1:
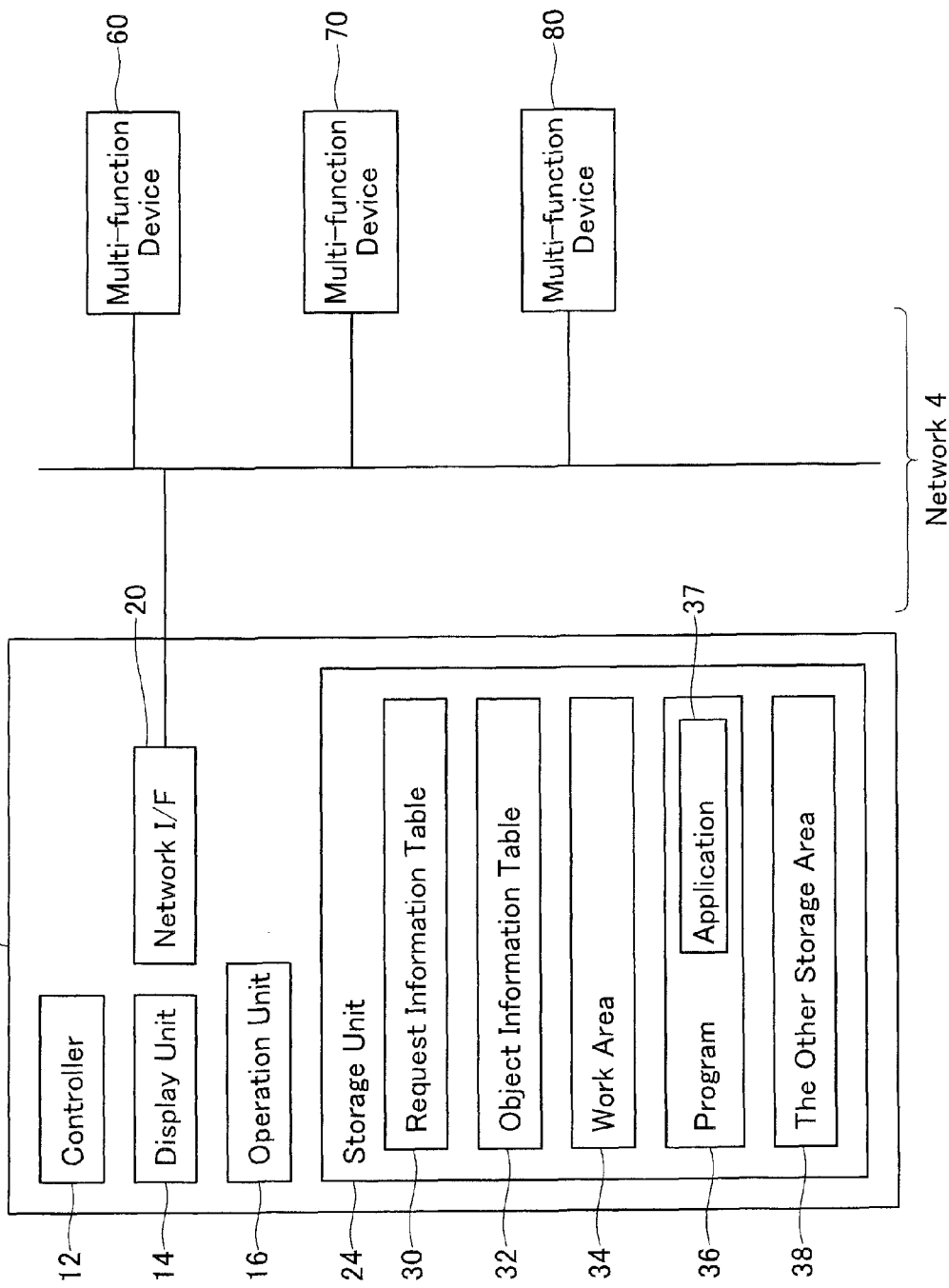
FIG. 1 shows a schematic configuration of an administration system of the first embodiment.

The first embodiment will be explained with reference to FIGS. 1 to 6. An administration system 2 comprises a network 4 including a LAN, etc., an administration device 10, a plurality of multi-function devices 60, 70, 80, etc. The devices 10, 60, 70, 80 are all connected with the network 4. The devices 10, 60, 70, 80 can communicate with each other via the network 4. The multi-function devices 60, etc. comprise a printing function, scanning function, fax communication function, etc.

(Configuration of the Administration Device)

The configuration of the administration device 10 will be explained in detail. In the present embodiment, an example will be explained using a PC as the administration device 10. The administration device 10 administers the multi-function devices 60, etc. by executing processes to acquire object information therefrom.

The administration device 10 comprises a controller 12, display unit 14, operation unit 16, network interface 20, and storage unit 24. The controller 12 executes processes in accordance with a program 36 stored in the storage unit 24. The display unit 14 displays a variety of information. The operation unit 16 comprises a plurality of keys. A user can input various instructions to the administration device 10 by operating the operation unit 16. The network interface 20 is connected with the network 4.

The storage unit 24 stores a request information table 30 and an object information table 32. The storage unit 24 comprises a work area 34. The work area 34 stores information created or acquired by the controller 12 executing processes. The storage unit 24 stores a program 36 to be executed by the controller 12. The program 36 includes an application program 37 for making requests and acquiring object information from the multi-function device 60, etc. The storage unit 24 further has an other storage area 38 for storing information other than the information 30, 32, 36.

Figure 2:
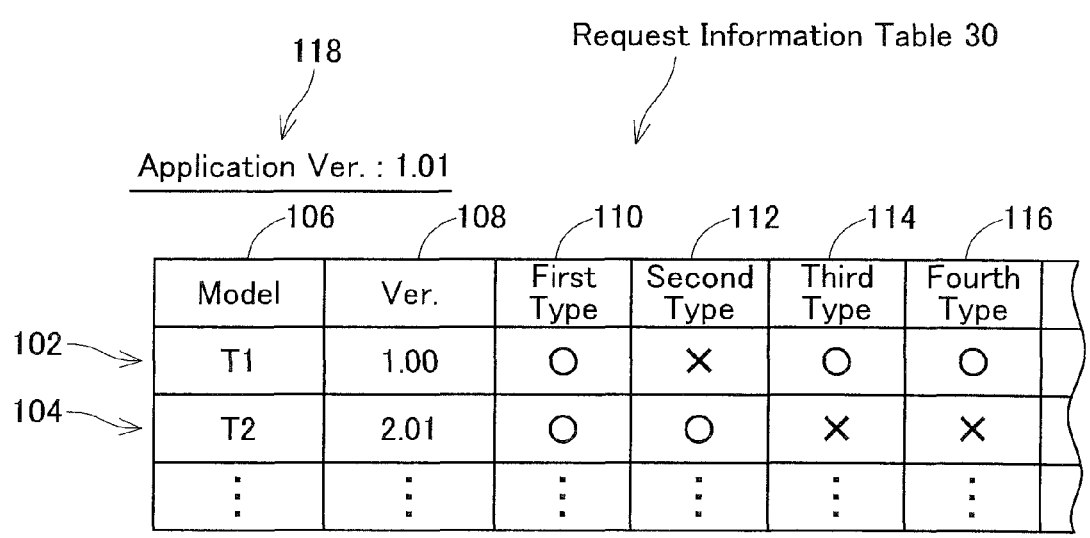
FIG. 2 shows an example of a request information table.

A request information table 30 exemplified in FIG. 2 includes a plurality of combination information 102, 104. The combination information 102, 104 is information in which the followings are associated: model information 106, firmware version information 108, and a plurality of response information 110, 112, 114, 116. Moreover, the request information table 30 further includes version information 118 of the application 37 (see FIG. 1). The model information 106 is information indicating the model of the multi-function device 60, etc. which is administered by the administration device 10. The model information 106 may be e.g., a model name of the multi-function device 60, etc., or a vendor name of the multi-function device 60, etc. The firmware version information 108 is information indicating the version of the firmware mounted in the multi-function device 60, etc. In the present embodiment, the higher the number of the firmware version information 108, the newer the firmware.

The administration device 10 is capable of making requests for a plurality of types of object information to the multi-function device 60, etc. Each of the response information 110, etc. corresponds to one respective type of object information. When requests for types of object information corresponding to the response information have been made, each of the response information 110, etc. indicates whether the object information can be acquired. For example, the response information 114 corresponded to a third type is "O" (meaning "available") in the combination information 102. This indicates that the third type of object information can be acquired when the request for the third type of object information is made to a device (e.g., the multi-function device 60) having model information "T1" and version information "1.00" included in the combination information 102. On the other hand, the third type of response information 114 is "x" (meaning "not available") in the combination information 104. This indicates that the third type of object information cannot be acquired even if the request for the third type of object information is made to a device (e.g., the multi-function device 70) having model information "T2" and version information "2.01" included in the combination information 104.

An object information table 32 as exemplified in FIG. 3 includes a plurality of combination information 132 to 136 (may be abbreviated as 132, etc.). The combination information 132 to 136 is information in which the following are associated: node name 138, MAC address 140, IP address 142, model information 144, firmware version information 146, and a plurality of types of object information 150, 152, 154, 156. The combination information 132, etc. indicates information relating to the multi-function devices 60, etc., which are administered by the administration device 10. If the combination information 132 is information relating to the multi-function device 60, the multi-function device 60 has node name "P001", MAC address "M1", etc. included in the combination information 132, and operates in accordance with a firmware having the firmware version information "1.00". The plurality of types of object information 150-156 indicates object information such as number of print pages, remaining ink, etc. Consequently, if the combination information 132 is information relating to the multi-function device 60, the multi-function device 60 has "1024" as the first type of object information (print pages). The multi-function device 60 does not have the second type of object information (remaining ink). Hence, the multi-function device 60 cannot respond to a request for the second type of object information. The first to fourth types of object information 150 to 156 of the object information table 32 correspond respectively to the first to fourth response information 110 to 116 of the request information table 30 (see FIG. 2). In the request information table 30, for example, model "T1" and firmware version information "1.00" are associated, "O" is stored as the response information 110 corresponded to the first type, and "x" is stored as the response information 112 corresponded to the second type. Corresponding to this, a device having model "T1" and firmware version information "1.00" (the combination information 132, 136) has, in the object information table 32, object information "1024" and "112" corresponded to the first type (i.e. object information to which it is can respond), and does not have object information corresponded to the second type (i.e. object information to which the device cannot respond).

(Outline of Processes Executed by Administration Device and Multi-Function device)

Figure 4:
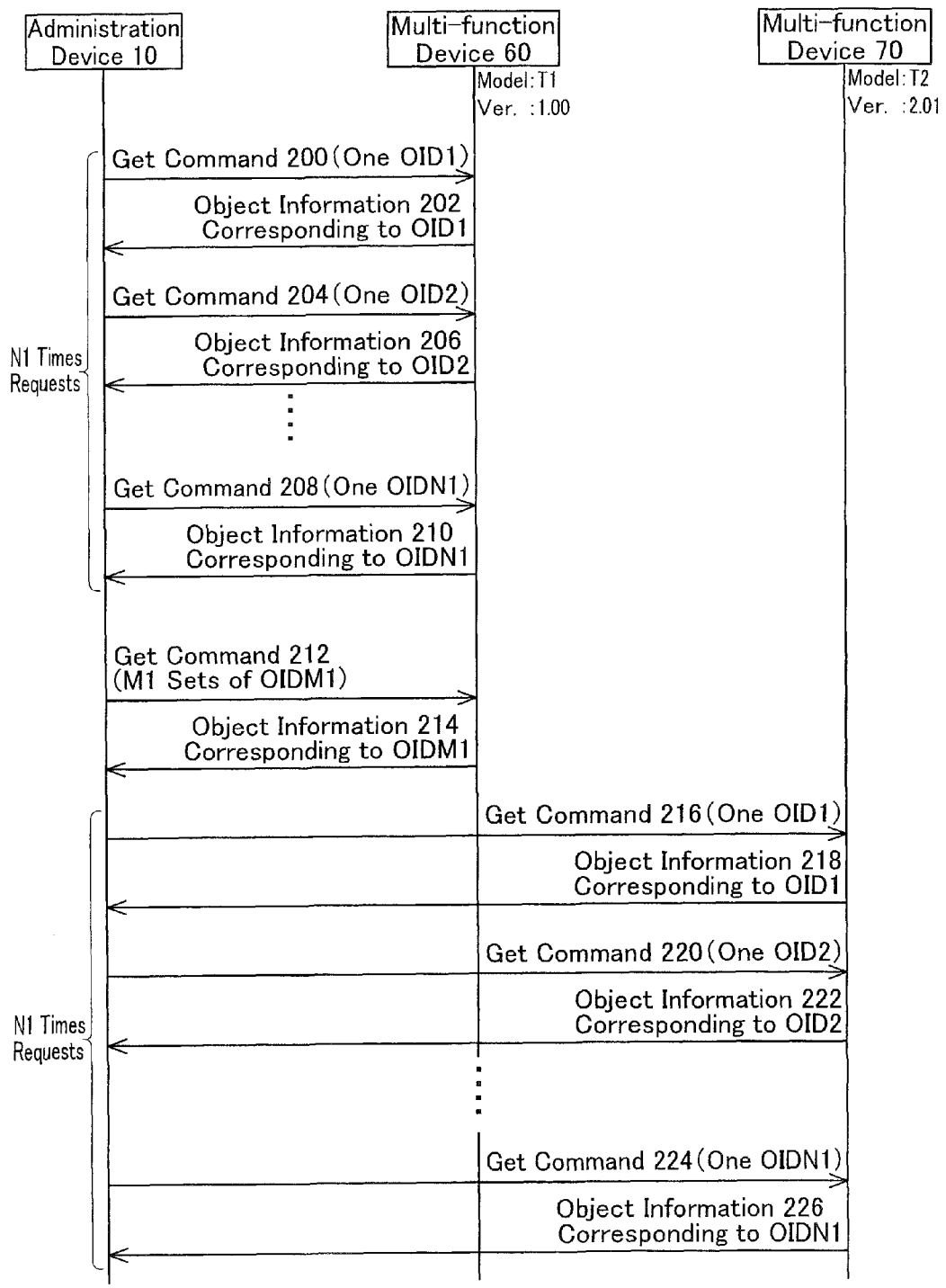
FIG. 4 shows a sequence view of processes executed by devices in the first embodiment.

A brief explanation will be given of the processes executed by the administration device 10 and the multi-function devices 60, 70, 80. In the example of FIG. 4, the multi-function device 60 has model information "T1" and firmware version information "1.00", and the multi-function device 70 has model information "T2" and firmware version information "2.01". The multi-function device 60 and the multi-function device 70 have differing model information and firmware version information.

In the present embodiment, the administration device 10 and the multi-function devices 60, 70, 80 communicate in accordance with an SNMP (Simple Network Management Protocol). The administration device 10 is equivalent to an SNMP manager, and the multi-function devices 60, 70, 80 are equivalent to SNMP agents. The administration device 10 makes requests for object information by sending a Get command to the multi-function devices 60, 70, 80. This Get command includes an object identifier (termed "OID" (Object Identifier) below) for identifying object information. Below, when the word "request" is used alone, this means that the administration device 10 makes a request object information and attempts to acquire the object information by sending the Get command to the multi-function devices 60, 70, 80.

The administration device 10 requests one type of object information by sending a Get command 200 to the multi-function device 60. The Get command 200 includes one OID1 corresponding to the one type of object information. If the multi-function device 60 has object information 202 corresponded to the OID1 (which means that the multi-function device 60 can respond), the multi-function device 60 sends the object information 202 to the administration device 10. Contrary to the example shown in FIG. 4, if the multi-function device 60 does not have the object information 202 corresponded to the OID1 (which means that the multi-function device 60 cannot respond), the multi-function device 60 sends a response indicating it cannot respond to the request regarding OID1 to the administration device 10. Next, the administration device 10 requests one other type of object information by sending a Get command 204 to the multi-function device 60. The Get command 204 includes an OID2 differing from the OID1. If the multi-function device 60 has object information 206 corresponding to the OID2 (the multi-function device 60 being able to respond), the multi-function device 60 sends the object information 206 to the administration device 10. If there are N1 types of object information that the administration device 10 can request, where N1 being an integer equal to or greater than two, the administration device 10 sequentially sends N1 sets of Get commands 200, etc. to the multi-function device 60. In other words, the administration device 10 makes the request to the multi-function device 60 for N1 times. Consequently, the administration device 10 acquires, from the multi-function device 60, M1 types of object information 202, etc. to which the multi-function device 60 had been able to respond, where M1 being an integer equal to or greater than 1 and less than N1.

As described above, the administration device 10 can learn which of the types of object information 202, etc. among the N1 types of object information can be acquired from the multi-function device 60. Thereafter, the administration device 10 acquires information from the multi-function device 60 e.g., periodically. When the administration device 10 needs to newly acquire the object information from the multi-function device 60, the administration device 10 sends, to the multi-function device 60, a Get command 212 which includes all of the OIDM1 corresponding to the M1 types of object information that can be acquired from the multi-function device 60 without sequentially sending Get commands each of which include one OID, as described above. If M1 is equal to or greater than 2, the Get command 212 includes two or more sets of OIDM1 corresponding to two or more types of object information. The multi-function device 60 in response sends, to the administration device 10, M1 types of object information 214 corresponded to the two or more types of OIDM1 included in the Get command 212. In a case where the plurality of OIDs included in the single Get command includes even one OID to which the multi-function device 60 cannot respond, the multi-function device 60—of the present embodiment sends a failure response (specifically "no such" response), which indicates that the multi-function device 60 does not have object information corresponded to that OID. Consequently, the failure response does not include any type of object information. If the plurality of OIDs to which the multi-function device 60 can respond includes even one OID to which the multi-function device 60 cannot respond, the multi-function device 60, etc. does not send object information corresponded to that OID. Since the multi-function device 60 can respond to all of the OIDM1 included in the Get command 212, the multi-function device 60 can definitely respond to the Get command 212, and the failure response is not sent.

Further, for the multi-function device 70 that has model information and firmware version information differing from those of the multi-function device 60, the administration device 10 executes processes identical to those for the multi-function device 60. The administration device 10 sequentially sends Get commands 216, 220, 224 each of which includes one OID. The administration device 10 makes requests for N1 times to the multi-function device 70. The multi-function device 70 sends, to the administration device 10, object information 218, 222, 226 regarding the OIDs to which it can respond (termed M2 types of object information below), M2 being an integer equal to or greater than 1 and less than N1. When the administration device 10 needs to newly acquire the object information from the multi-function device 70 at a later occasion, the administration device 10 sends, to the multi-function device 70, a Get command (not shown) which includes all of the OIDM2 corresponding to the M2 types of object information that can be acquired from the multi-function device 70 without sequentially sending Get commands including one OID per each. In response thereto, the multi-function device 70 sends, to the administration device 10, M2 types of object information (not shown) corresponded to all of the OIDM2.

Figure 5:
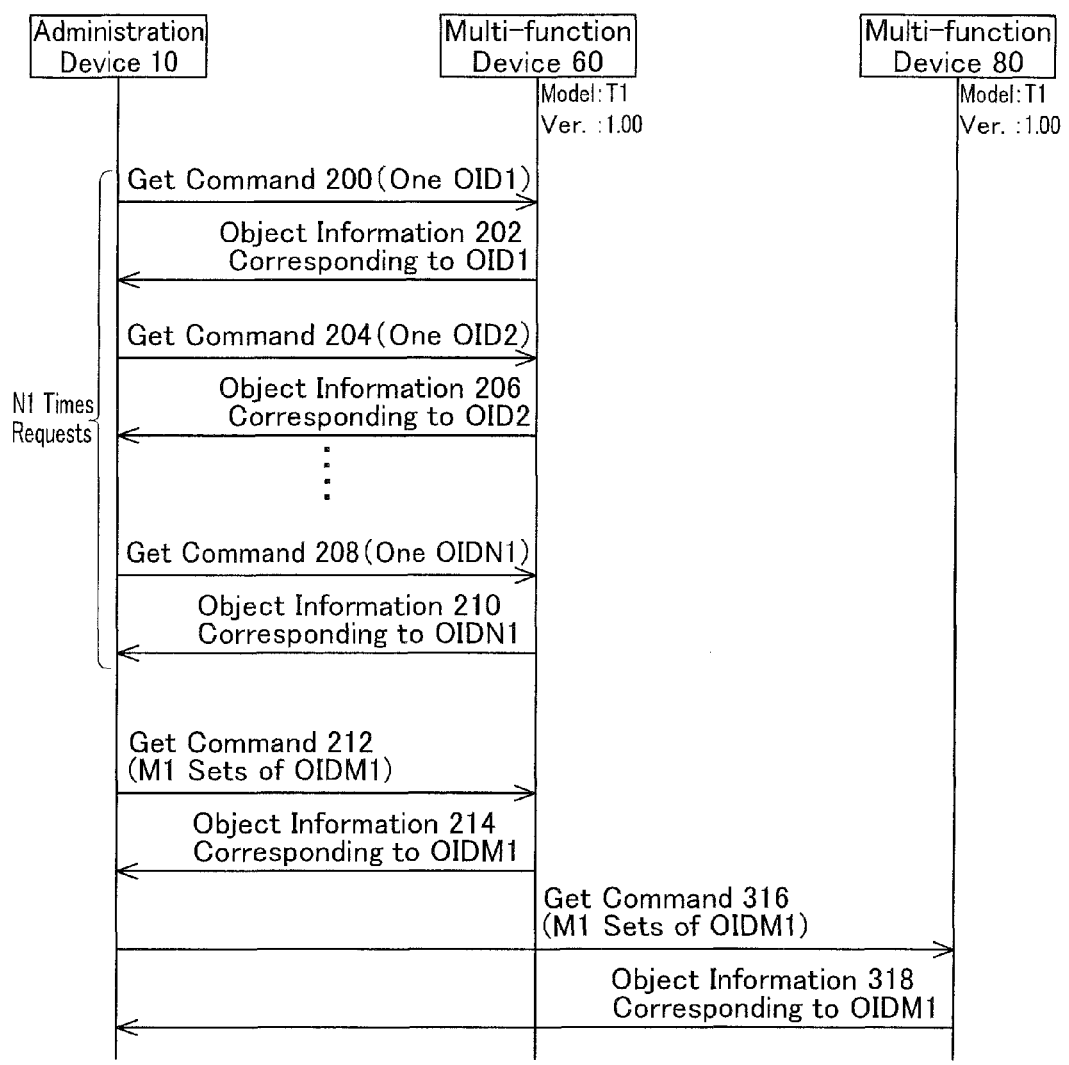
FIG. 5 shows a sequence view of processes executed by the devices in the first embodiment.

In the example of FIG. 5, the multi-function device 60 and the multi-function device 80 have identical model information and firmware version information.

Similar to the example of FIG. 4, the administration device 10 makes N1 times of requests to the multi-function device 60. Further, also similar to the example of FIG. 4, the administration device 10 then sends the Get command 212 which includes the OIDM1 to the multi-function device 60 when the administration device 10 needs to newly acquire the object information from the multi-function device 60 at the later occasion.

When the administration device 10 needs to acquire the object information from the multi-function device 80, the administration device 10 does not sequentially send Get commands including one OID per each. That is, the administration device 10 avoids sending N1 times of requests. Instead, the administration device 10 sends, to the multi-function device 80, a Get command 316 which includes all the M1 sets of OIDM1 (i.e., the Get command 316 having contents identical to the Get command 212). The two multi-function devices 60, 80, which have identical model information and version information, are also identical with respect to the types of object information to which they can respond. Consequently, as in the case of the multi-function device 60, the multi-function device 80 can send M1 types of object information 318 to the administration device 10 in response to the Get command 316.

(Process Executed by Administration Device 10)

Next, the contents of a process executed by the controller 12 of the administration device 10 in accordance with the application 37 will be explained with reference to FIG. 6. The acquisition process is executed if at least one of the following conditions (1) and (2) is fulfilled. (1) The controller 12 monitors the progress of a polling time determined in advance. If the polling time has elapsed, the controller 12 starts the acquisition process. (2) The controller 12 monitors whether the application 37 has been upgraded. If the application 37 has been upgraded, in the present embodiment, the controller 12 clears the request information table 30 (see FIG. 2) and the object information table 32 (see FIG. 3), then starts the acquisition process.

The controller 12 monitors whether the application 37 has been upgraded by periodically comparing the version information 118 included in the request information table 30 with the version of the application 37 in the program 36. Consequently, if the controller 12 determines that the version of the application 37 in the program 36 has become newer than the version information 118 included in the request information table 30, the controller 12 determines that the application 37 has been upgraded. In this case, the controller 12 starts the acquisition process, and rewrites the version information 118 included in the request information table 30 to the new version. If the version of the application 37 in the program 36 is the same as the version information 118 included in the request information table 30, the controller 12 does not decide that the application 37 has been upgraded.

The controller 12 can learn of the plurality of multi-function devices 60, etc. connected with the network 4 by broadcasting a predetermined command. The controller 12 specifies one multi-function device (termed specific multi-function device below) from which object information is to be acquired from among the plurality of multi-function devices 60, etc. connected with the network 4 (S10). The controller 12 acquires basic information from the specific multi-function device by making a request for the basic information to the specific multi-function device specified in S10 (S12). The "basic information" is information which includes the node name, MAC address, IP address, model information, and firmware version information of the multi-function device. Upon acquiring the basic information from the specific multi-function device, the controller 12 continues to S14.

In S14, the controller 12 judges whether combination information (termed specific combination information below) including information that matches the model information and firmware version information acquired in S12 is present in the request information table 30. If the answer is YES in S14, the controller 12 continues to S16. If the answer is NO in S14, the controller 12 continues to S20.

In S16, the controller 12 specifies, from the specific combination information (e.g., 102) in the request information table 30, the object information types (the types indicated by "O") that can be acquired by the administration device 10. Then, the controller 12 sends, to the specific multi-function device, one Get command which collectively includes OIDs corresponding to all the types specified in S16 (S18). Moreover, a limit is set on the number of OIDs which can be included in one Get command, and if the number of OIDs corresponding to all the types specified in S16 exceeds the limit, the controller 12 sends a plurality of Get commands. The process of sending the Get command in S18 corresponds to the process of sending the Get command 212 in FIGS. 4 and 5, and corresponds to the process of sending the Get command 316 in FIG. 5. The specific multi-function device sends, to the administration device 10, the types of object information corresponded to the OIDs included in the Get command sent in S18. The administration device 10 acquires the object information corresponded to the OIDs included in the Get command sent in S18. Upon ending S18, the controller 12 continues to S24.

In S20, the controller 12 sequentially sends Get commands each including one OID corresponding to the type of object information for all the types of object information the controller 12 is capable of making a request. Consequently, the administration device 10 sequentially acquires, from the specific multi-function device, the types of object information to which the specific multi-function device can respond. The process of sequentially sending the Get commands in S20 corresponds to the process of sending the Get commands 200, 204, 208, 216, 220, 224 in FIGS. 4 and 5.

Next, the controller 12 writes new combination information to the request information table 30 (see FIG. 2) (S22). The controller 12 first writes the model information and firmware version information acquired from the specific multi-function device in S12 as the model information 106 and firmware version information 108 of the new combination information. Next, the controller 12 writes the plurality of response information 110 to 116 of the new combination information. The controller 12 writes a value indicating "O" (e.g., "1") as the response information (such as in column 110) that corresponds to a type that can be acquired from the specific multi-function device in S20, and writes a value indicating "x" (e.g., "0") as the response information (such as in column 112) that corresponds to a type that can not be acquired from the specific multi-function device. Upon finishing writing in S20, the controller 12 continues to S24.

In S24, the controller 12 verifies whether the processes S12 to S22 have been executed for all the multi-function devices 60, etc. connected with the network 4. If the answer is YES, the controller 12 continues to S26. If the answer is NO in S24, the controller 12 returns to S10, specifies one other multi-function device, and repeats the same processes.

In S26, the controller 12 updates the object information table 32 (see FIG. 3). In the case where object information was newly acquired in S18 from the multi-function device (e.g., 60) corresponding to the stored combination information (e.g., 132) already stored in the object information table 32, the controller 12 upgrades the old object information 150 to 156 included in the stored combination information to the newly acquired object information. Further, in the case where, e.g., object information was newly acquired in S18 or S20 from the multi-function device (e.g., 80) for which corresponding combination information is not present in the object information table 32, the controller 12 creates new combination information in the object information table 32. In this case, the controller 12 first writes the basic information acquired in S12 as the information 138 to 146 of the new combination information. Next, the controller 12 writes the object information acquired in S18 or S20 as the plurality of object information 150 to 156 of the new combination information. Upon ending S26, the controller 12 ends the acquisition process.

The administration device 10 of the present embodiment has been explained in detail above. In the case where all the types of object information which the administration device 10 can make requests using the application 37 mounted in the administration device 10 are N1 types, in S20 of the acquisition process of FIG. 6, the administration device 10 makes N1 times of requests for making requests for the N1 types of object information (see FIGS. 4 and 5) to, e.g., the multi-function device 60. The administration device 10 can thereby learn that the M1 types of object information can be acquired from the multi-function device 60. The administration device 10 can write, to the request information table 30 (see FIG. 2), the model information 106 and the firmware version information 108 of the multi-function device 60, and the response information 110 to 116 relating to the types of object information that can be acquired from the multi-function device 60. When the polling time has elapsed and the object information is to be re-acquired from the multi-function device 60, the administration device 10 does not make the request to the multi-function device 60 N1 times. Instead, as shown in S16 of FIG. 6, the administration device 10 acquires the M1 types of object information from the multi-function device 60 by selectively making requests, to the multi-function device 60, for the M1 types of object information that can be acquired from the multi-function device 60 (see the Get command 212 of FIG. 4). Since the types of object information that cannot be acquired from the multi-function device 60 are not requested to the multi-function device 60, unnecessary requests can be prevented.

Further, in the state where the combination information corresponding to the multi-function device 60 is already stored in the request information table 30, when the object information is to be acquired from the multi-function device 80 that has the same model information and firmware version information as the multi-function device 60, the administration device 10 does not make the request to the multi-function device 80 N1 times. Instead, as shown in S16 of FIG. 6, the administration device 10 acquires the M1 types of object information from the multi-function device 80 by selectively making requests, to the multi-function device 80, for the M1 types of object information that, since they can be acquired from the multi-function device 60, can also be acquired from the multi-function device 80 (see the Get command 316 of FIG. 5). Since the types of object information that is assumed as unable to be acquired from the multi-function device 80 are not requested to the multi-function device 80, unnecessary requests can be prevented.

In the present embodiment, if the application 37 mounted in the administration device 10 has been upgraded, the request information table 30 (see FIG. 2) and the object information table 32 (see FIG. 3) are cleared, and then the acquisition process is executed. In the case where all the types of object information that the administration device 10 can make requests using the upgraded application are N2 types, N2 being an integer equal to or more than two, the administration device 10 makes the request N2 times for the N2 types of object information to, e.g., the multi-function device 60, as shown in S20 of FIG. 6. The administration device 10 can thereby learn that M3 types of the object information can be acquired from the multi-function device 60, M3 being an integer equal to or greater than 1 and equal to or below N2. The administration device 10 can thus write, for the multi-function device 60, the response information 110 to 116 corresponding to the N2 types of object information that can be requested using the upgraded application. When the object information needs to be re-acquired from the multi-function device 60, the administration device 10 acquires the M3 types of object information from the multi-function device 60 by selectively making requests, to the multi-function device 60, for the M3 types of object information without making the request to the multi-function device 60 N2 times. Similarly, when the object information is to be acquired from the multi-function device 80, the administration device 10 acquires the M3 types of object information from the multi-function device 80 by selectively making requests for the M3 types of object information to the multi-function device 80 without making the request to the multi-function device 80 N2 times. Since the types of object information that cannot be acquired from the multi-function device 80 are not requested to the multi-function device 80, unnecessary requests can be prevented. Since the types of object information that cannot be acquired from the multi-function devices 60, 80 are not requested to the multi-function devices 60, 80, unnecessary requests can be prevented.

Figure 6:
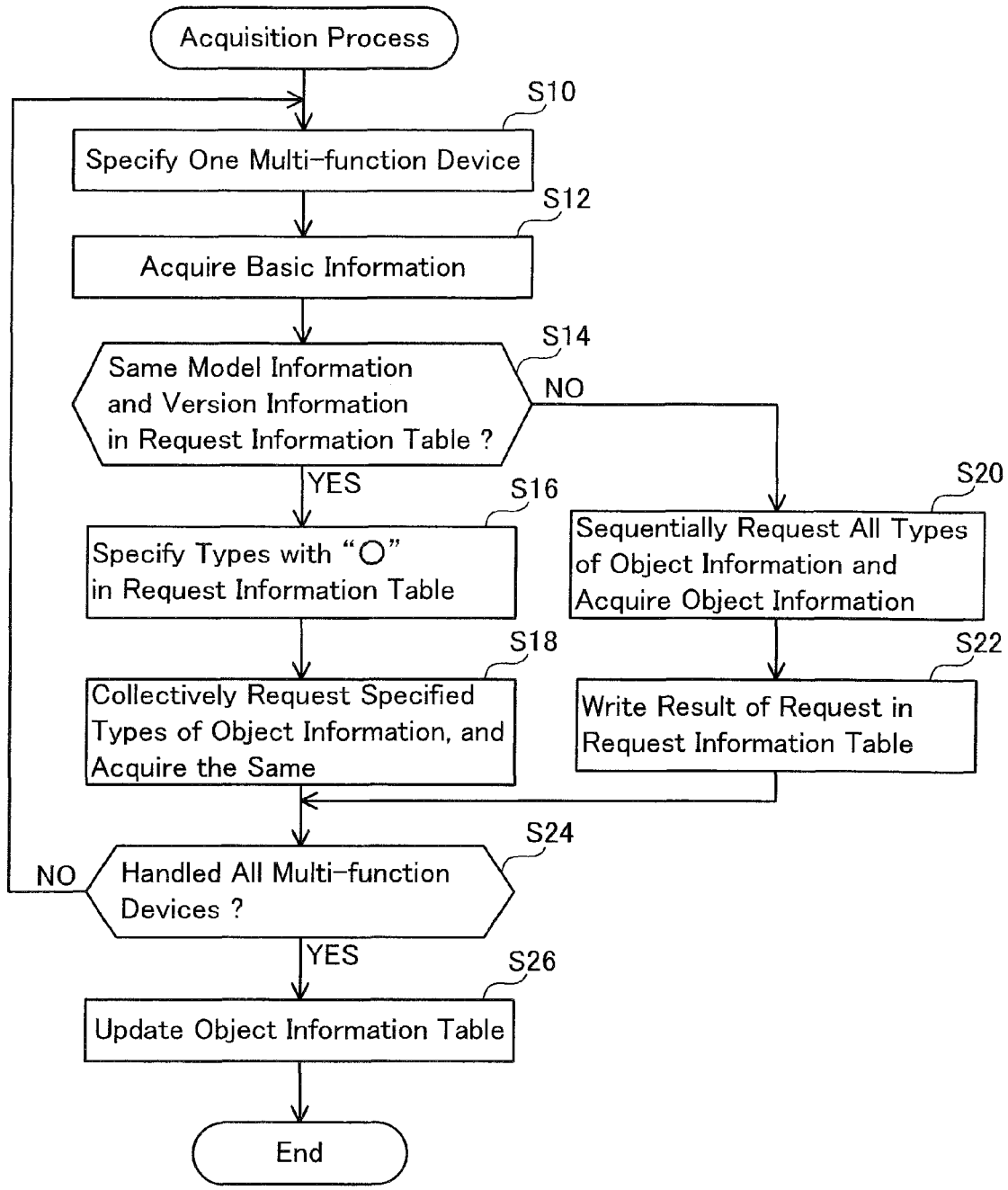
FIG. 6 shows a flowchart of an acquisition process of the first embodiment.

In S18 of FIG. 6, one Get command is sent which includes a plurality of OIDs corresponding to the plurality of types of object information which were specified in S16 as being acquirable. This Get command includes only the plurality of OIDs corresponding to the plurality of types of object information to which the multi-function device 60 can respond. Consequently, the administration device 10 can acquire the plurality of types of object information together by sending one Get command to the multi-function device 60. Moreover, since the Get command does not include any OIDs corresponding to object information to which the multi-function device 60 cannot respond, the failure response is not received from the multi-function device 60. The Get command thus does not consequently become an unnecessary request. By means of this technique, the number of Get commands sent from the administration device 10 can be reduced in the present embodiment compared to the technique of sequentially sending a Get command for each one type of object information among the plurality of types of object information. Consequently, the communication load of the network 4 between the administration device 10 and the multi-function device 60—can be reduced.

Second Embodiment

The second embodiment will be explained. In the present embodiment, the contents of the acquisition process executed when the application 37 (see FIG. 1) has been upgraded differ from the first embodiment. In the present embodiment, when the application 37 has been upgraded, the object information table 32 (see FIG. 3) is cleared, but the contents stored in the request information table 30 (see FIG. 2) are not cleared. The object information types that the administration device 10 can make requests before the upgrading of the application 37 can usually also be requested after its upgrading. The administration device 10 can make requests for e.g., the first to fourth types of object information shown in FIGS. 2 and 3 before the upgrading. After the upgrading, also, the administration device 10 can make requests for the first to fourth types of object information. When the application 37 is upgraded, the number of object information types that the administration device 10 can make requests for usually increases. In a case where the object information types that the administration device 10 can make requests before upgrading the application 37 has been limited to the first to fourth types, after upgrading the application 37, the administration device 10 may become capable of making requests for fifth and sixth types in addition to the first to fourth types. The controller 12 adds, to the request information table 30 and the object information table 32, columns corresponding to the new types that can be requested following the upgrading. Then the controller 12 executes the acquisition process shown in FIG. 7. Moreover, the acquisition process executed when the polling time has elapsed is the same as in the first embodiment (see FIG. 6).

The processes S30 to S34 are the same as S10 to S14 of FIG. 6. If the answer is YES in S34, the controller 12 continues to S36. If the answer is NO in S34, the controller 12 continues to S44. The processes S44 and S46 are the same as S20 and S22 of FIG. 6. As described above, since columns corresponding to the new types are added to the request information table 30 before starting the acquisition process of FIG. 7, the object information is requested for the new types as well in S44.

The processes S36 and S38 are the same as S16 and S18 of FIG. 6. In S40, the controller 12 sequentially sends Get commands each of which includes one OID corresponding to one of the specific types of object information that the administration device 10 can make requests for, these types having been newly added by upgrading the application 37. As a result of the process S40, the administration device 10 sequentially acquires, from the specific multi-function device specified in S30, the types of object information to which the specific multi-function device can respond.

Next, the controller 12 writes response information corresponding to the new types, which became possible to make requests due to the upgrading, to the specific combination information specified in S34 within the request information table 30 (see FIG. 2) (S42). The controller 12 writes a value indicating "O" as the response information corresponding to a type (e.g., fifth type) that can be acquired from the specific multi-function device in S40, and writes a value indicating "x" as the response information corresponding to a type (e.g., sixth type) that can not be acquired from the specific multi-function device in S40. Upon finishing writing in S42, the controller 12 continues to S48. The processes S48 and S50 are the same as S24 and S26 of FIG. 6.

According to the acquisition process of FIG. 7, the administration device 10 executes processes, e.g. as described below with reference to FIG. 8. The multi-function device 60 and the multi-function device 80 have matching versions of model and firmware. Combination information (e.g., 102) corresponding to the multi-function device 60 is stored in the request information table 30 before the upgrading of the application 37. The response information 110 to 116 corresponding to N1 types of object information that the administration device 10 can make requests before the upgrading is stored in this combination information. As with the first embodiment, the types of object information that can be acquired from the multi-function device 60 are M1 types.

In this example, when the application 37 is upgraded (S28), the object information types that the administration device 10 can make requests increases from N1 types to N2 types. In the present embodiment, N3 (N3=N2−N1) types of object information, N3 being an integer equal to or greater than 1, are added as the types that the administration device 10 can make requests. First, in S36, S38 of FIG. 7, the administration device 10 sends, to the multi-function device 60, one Get command 400 which collectively includes M1 sets of OIDs corresponding to M1 types of object information that can be acquired from the multi-function device 60, and acquires M1 types of object information 402 from the multi-function device 60. Next, in S40 of FIG. 7, the administration device 10 makes a request N3 times for making requests for the N3 types of object information that have newly become possible to request. As shown in FIG. 8, the administration device 10 sequentially sends, to the multi-function device 60, Get commands 404, 408 for requesting the N3 types of object information. In response thereto, the multi-function device 60 sequentially sends, to the administration device 10, object information 406, 410 to which it can respond. The administration device 10 can thereby learn that M4 types of object information can be acquired from the multi-function device 60, M4 being an integer equal to or greater than 1 and equal to or below N3. In S38 of FIG. 7, the administration device 10 does not sequentially send Get commands for the types of object information (i.e. the N1 types of object information) that the administration device 10 had been able to make requests before the upgrading. The administration device 10 does not sequentially make requests for the types of object information that it had been able to make requests before the upgrading. Consequently, the number of Get commands sent to the multi-function device 60 can be reduced.

Figure 7:
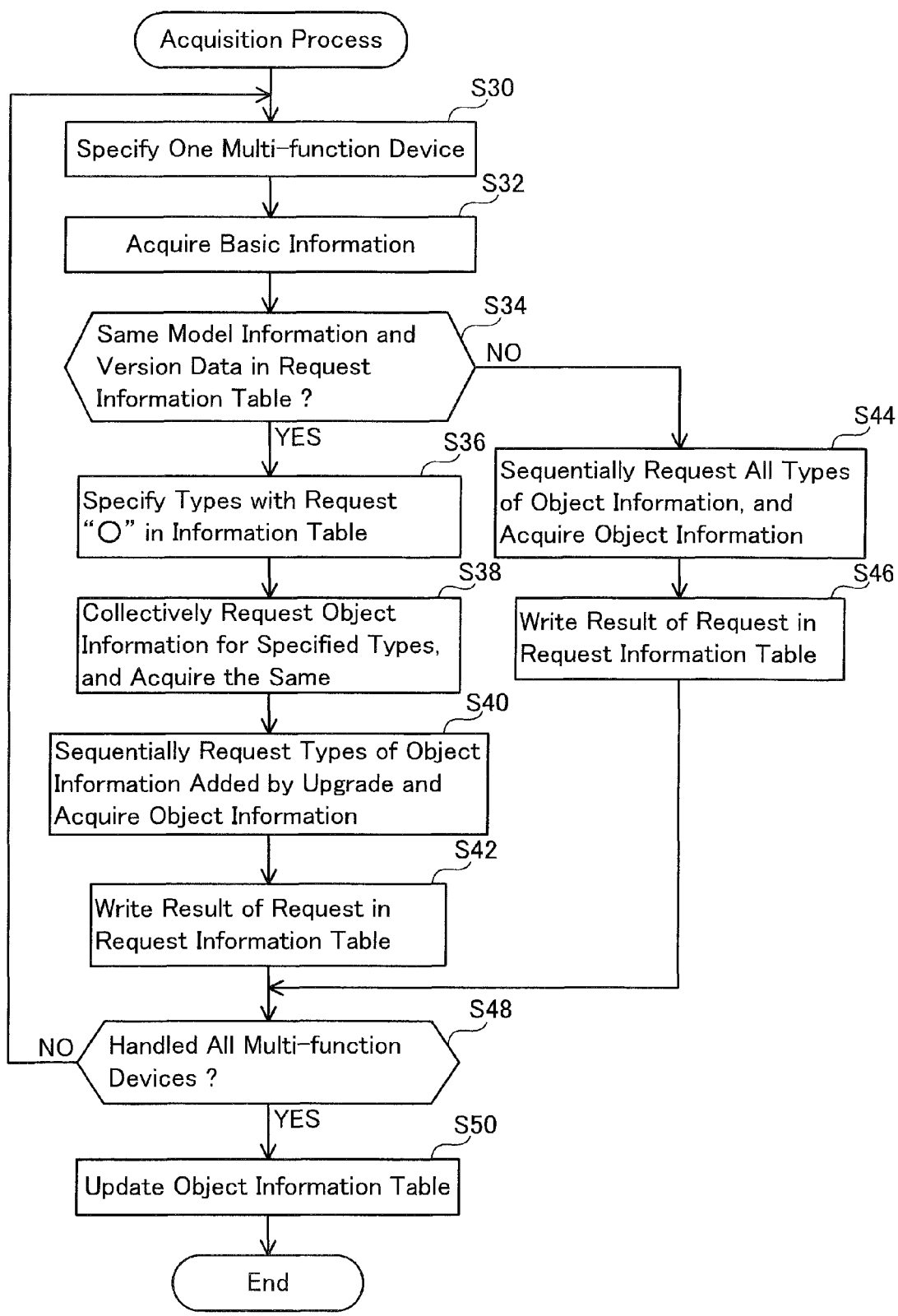
FIG. 7 shows a flowchart of an acquisition process of the second embodiment.
Figure 8:
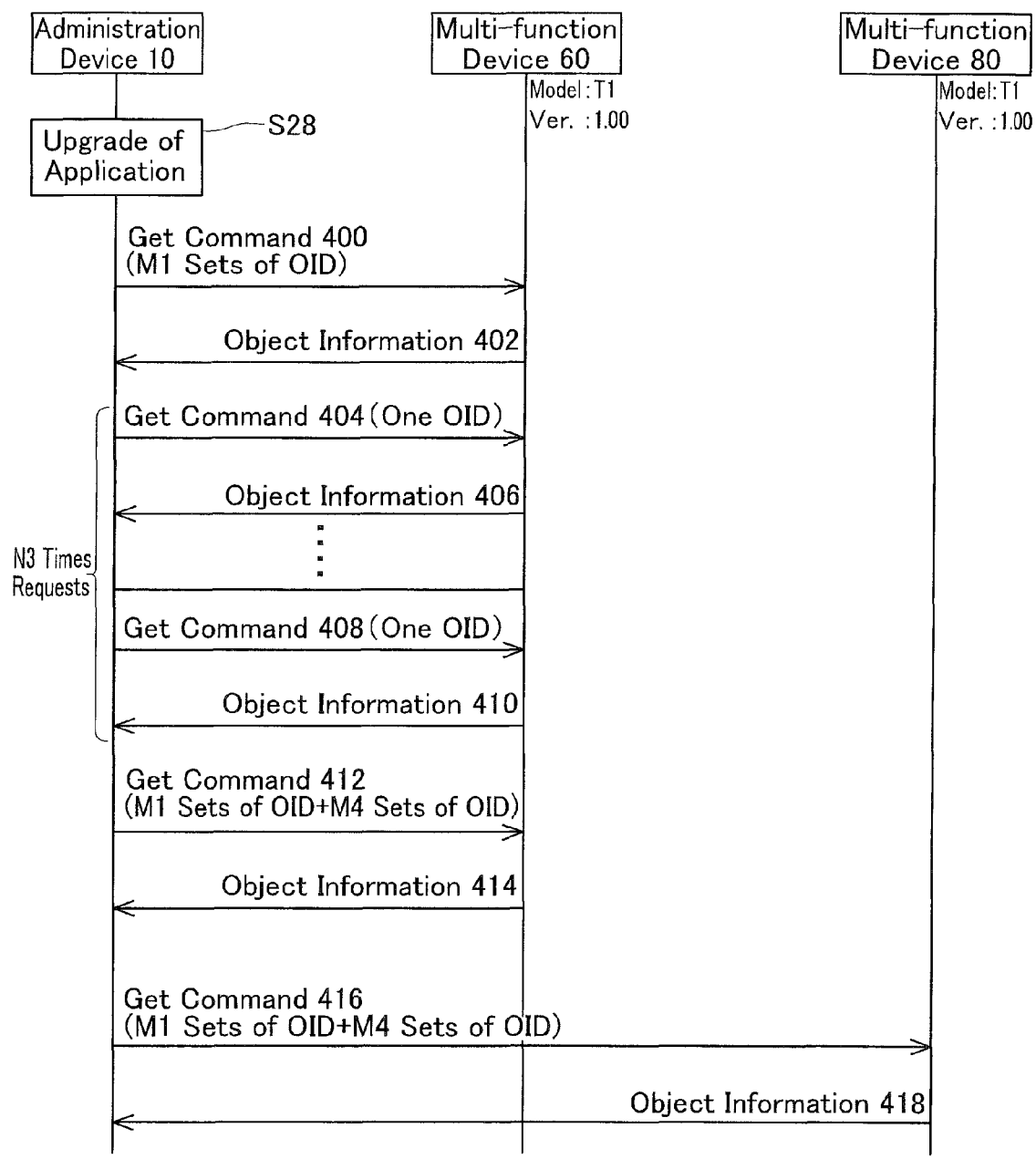
FIG. 8 shows a sequence view of processes executed by devices in the second embodiment.

In S42 of FIG. 7, "O" is written to the response information corresponding to the M4 types of object information in the combination information corresponding to the multi-function device 60 in the request information table 30. Consequently, when the administration device 10 needs to re-acquire the object information from the multi-function device 60 (see S16 and S18 of FIG. 6) due e.g., to the polling time having elapsed, the administration device 10 sends, to the multi-function device 60, a Get command 412 which includes M1+M4 sets of OIDs corresponding to the M1 types of object information that could have been acquired from the multi-function device 60 before the upgrading, and the M4 types of object information that can be newly acquired from the multi-function device 60 after the upgrading. The administration device 10 thereby acquires M1+M4 types of object information 414 from the multi-function device 60. Further, when the administration device 10 needs to acquire the object information from the multi-function device 80 that has the model information and firmware version information identical to that of the multi-function device 60, the administration device 10 omits making the request N3 times for requesting the N3 types of object information therefrom. Instead, the administration device 10 sends, to the multi-function device 80, one collective Get command 416 which includes the M1+M4 sets of OIDs corresponding to the M1 types of object information and the M4 types of object information that can be acquired from the multi-function device 60. The administration device 10 thereby acquires M1+M4 types of object information 418 from the multi-function device 80. Since the administration device 10 does not make requests, to the multi-function device 80, for types of object information that cannot be acquired therefrom, unnecessary requests can be prevented.

Third Embodiment

The third embodiment will be explained with reference to FIGS. 9-10. In the present embodiment, the contents of the acquisition process differ from the first embodiment. In a first acquisition process in FIG. 9, the processes S60 and S62 are the same as S10 and S12 of FIG. 6. The controller 12 judges whether specific combination information which includes model information matching the model information acquired in S62 is present in the request information table 30 (S64). If the answer is YES, the controller 12 continues to S66. If the answer is NO in S64, the controller 12 continues to S72. In S66, the controller 12 judges whether the specific combination information includes firmware version information matching the firmware version information acquired in S62. If the answer is YES, the controller 12 continues to S68. If the answer is NO in S66, the controller 12 continues to S76.

The processes S68 and S70 are the same as S16 and S18 of FIG. 6. Upon ending S70, the controller 12 continues to S88. In S76, the controller 12 judges whether the firmware version information of the specific multi-function device specified in S60 is older than the firmware version information included in the specific combination information. If the answer is YES, the controller 12 continues to S72. The processes S72 and S74 are the same as S20 and S22 of FIG. 6.

If the answer is NO in S76, the controller 12 continues to S78. If the answer is NO in S76, the firmware version information of the specific multi-function device specified in S60 is newer than that of the specific combination information specified from the request information table 30 (see FIG. 2) in S64. The specific multi-function device having the new version firmware can respond to all the types of object information to which the multi-function device having the old version firmware can respond. For example, in the request information table 30 of FIG. 2, "O" is stored in association with model "T1" and firmware version information "1.00" as the response information 110, 114, 116 corresponding to the first type, third type, and fourth type of object information. If the specific multi-function device has model "T1" and firmware version information "1.01", the specific multi-function device can respond to the first type, third type, and fourth type of object information. Further, when firmware is upgraded, the object information types which can be responded to usually increase. Consequently, in the case of the above example, the specific multi-function device having the firmware with the firmware version information "1.01" may be able to respond to the second type of object information to which the firmware with the firmware version information "1.00" cannot respond. To verify this, the administration device 10 executes a process S84 (to be described).

In S78, the controller 12 creates new combination information. First, the controller 12 writes the model information and version information of the specific multi-function device acquired in S62 as the model information 106 and the firmware version information 108 of the new combination information. Further, the controller 12 writes all the response information 110 to 116 included in the specific combination information specified in S64 as the response information 110 to 116 of the new combination information. Next, the controller 12 specifies the object information types (the types indicated by "O") that the administration device 10 can acquire from among the response information 110 to 116 included in the new combination information (S80). Next, the controller 12 sends, to the specific multi-function device, one Get command which collectively includes OIDs corresponding to all the types specified in S80 (S82). Consequently, the administration device 10 acquires the object information corresponded to the OIDs included in the Get command sent in S82.

As described above, the specific multi-function device having the new version firmware may be capable of responding to some or all of the object information to which the multi-function device having the old version firmware can respond. For each of the object information types (the types indicated by "x") that the administration device 10 cannot acquire from among the response information included in the new combination information, the controller 12 sequentially sends Get commands each including one OID corresponding to one of those types (S84). The administration device 10 can thereby acquire the types of object information to which the specific multi-function device having the new version firmware is capable of responding. Next, for the types indicated by "x" in the response information 110 to 116 in the new combination information, the controller 12 changes the response information corresponding to those types to "O" in a case where the object information has been acquired in S84 (S86). Upon ending S86, the controller 12 continues to S88. The processes S88 and S90 are the same as S24 and S26 of FIG. 6.

According to the acquisition process of FIG. 9, the administration device 10 executes processes, e.g. as described below. The multi-function device 80 has the same model information as the multi-function device 60, and has version firmware newer than that of the multi-function device 60. Combination information (e.g., 102) corresponding to the multi-function device 60 is stored in the request information table 30. In this combination information, as with the first embodiment, the types of object information that can be acquired from the multi-function device 60 are M1 types. In this case, if the multi-function device 80 is specified in S60 of FIG. 9, the administration device 10 determines YES in S64, determines NO in S66, and determines NO in S76. In S78, which is executed next, the administration device 10 creates new combination information corresponding to the multi-function device 80 in the request information table 30. Next, in S80, S82, the administration device 10 sends, to the multi-function device 80, one Get command 500 which collectively includes the M1 sets of OIDs corresponding to the M1 types of object information that can be acquired from the multi-function device 60, and acquires M1 types of object information 502 from the multi-function device 80. Next, in S84, the administration device 10 specifies the object information types to which the multi-function device 60 can not respond. In a case where the object information types specified here are N4 types, N4 being an integer equal to or greater than 1, the administration device 10 makes a request N4 times for requesting, to the multi-function device 80 specified in S60, the N4 types of object information. As shown in FIG. 10, the administration device 10 sequentially sends, to the multi-function device 80, Get commands 504, 508 for requesting the N4 types of object information. In response thereto, the multi-function device 80 sequentially sends, to the administration device 10, object information 506, 510 to which it can respond. The administration device 10 can thereby learn that M5 types of object information can be acquired from the multi-function device 80. In S82 of FIG. 9, the administration device 10 does not sequentially send Get commands for the types of object information that can be acquired from the multi-function device 60. The administration device 10 does not sequentially make requests for the types of object information that can be acquired from the multi-function device 60. Consequently, the number of Get commands sent to the multi-function device 80 can be reduced.

Figure 9:
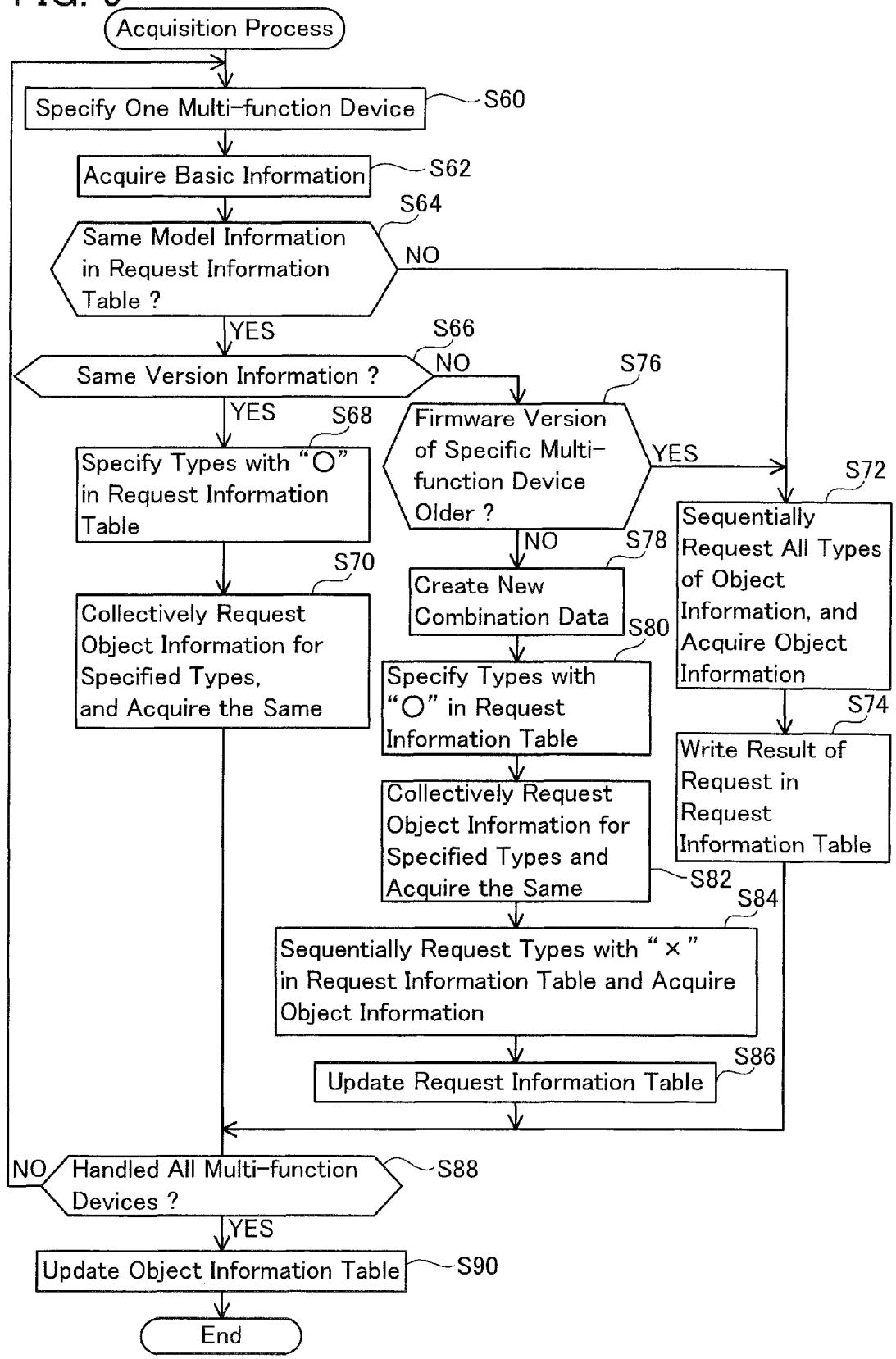
FIG. 9 shows a flowchart of an acquisition process of the third embodiment.
Figure 10:
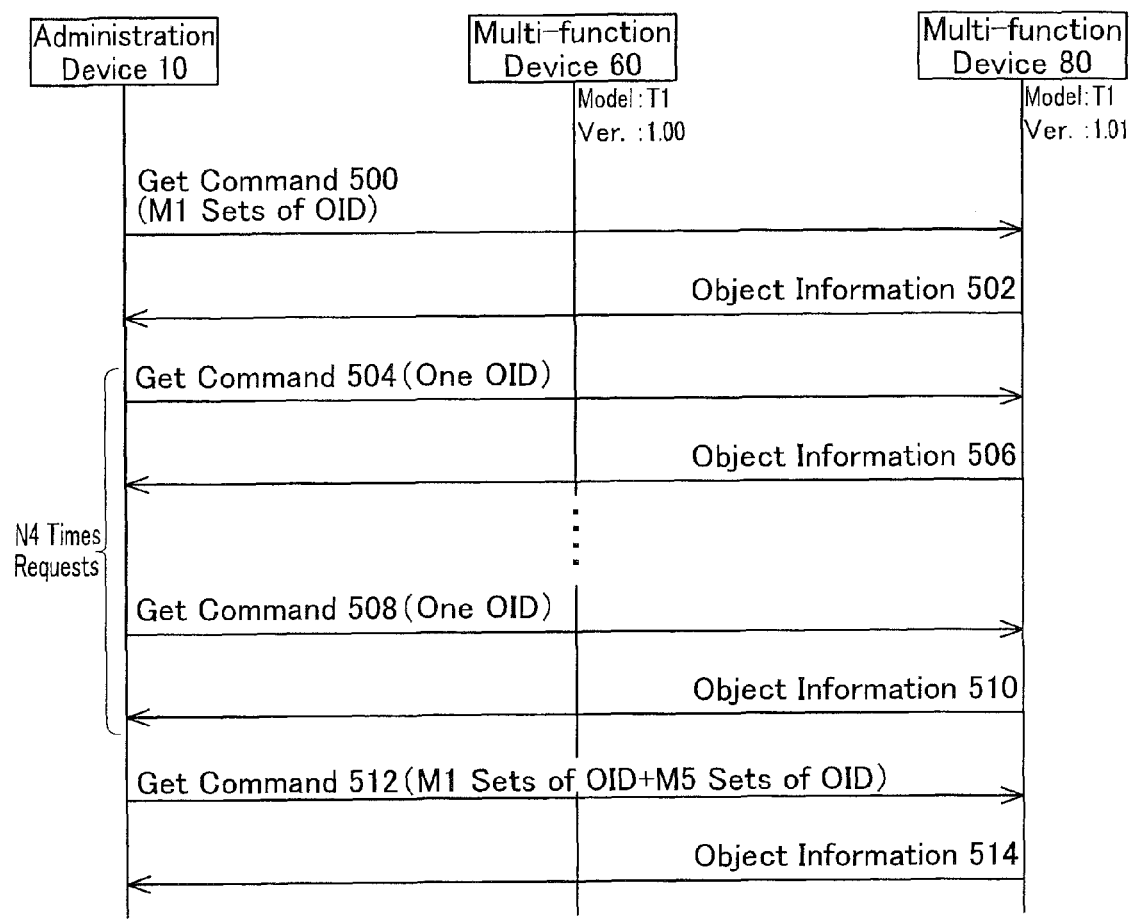
FIG. 10 shows a sequence view of processes executed by devices in the third embodiment.

In the processes S78 and S86 of FIG. 9, "O" is written to the response information 110 to 116 corresponding to the M1 types of object information and the M5 types of object information in the combination information corresponding to the multi-function device 80 in the request information table 30. Consequently, when the administration device 10 needs to re-acquire the object information from the multi-function device 80 (see S68, S70 of FIG. 9) as shown in FIG. 8, the administration device 10 sends, to the multi-function device 80, a Get command 512 which collectively includes M1+M5 sets of OIDs corresponding to the M1 types of object information and the M5 types of object information. The administration device 10 thereby acquires M1+M5 types of object information 514 from the multi-function device 80.

As is clear from the above description, the processes S20 of FIG. 6, S40, S44 of FIG. 7, and S72, S84 of FIG. 9 correspond to the processes executed by the first acquisition unit of the present invention. The processes S18 of FIG. 6, S38 of FIG. 7, and S70, S82 of FIG. 9 correspond to the processes executed by the second acquisition unit of the present invention. The processes S12 of FIG. 6, S32 of FIG. 7, and S62 of FIG. 9 correspond to the processes executed by the basic information acquisition unit of the present invention. The processes S14 of FIG. 6, S34 of FIG. 7, and S64, S66 of FIG. 9 correspond to the processes executed by the judging unit of the present invention. The case of YES in S14 of FIG. 6, S34 of FIG. 7, and S66 of FIG. 9 corresponds to the first case of the present invention. The case of NO in S14 of FIG. 6, S34 of FIG. 7, and S64, S66 of FIG. 9 corresponds to the second case of the present invention. Further, the OID, Get command, and the application 37 correspond respectively to the object identification information, request packet, and control program.

Variants of the embodiments will be explained. If the answer is YES in S76 in FIG. 9, the following processes can be executed instead of S72. The controller 12 creates new combination information in the request information table 30. First, the controller 12 writes the model information and version information of the specific multi-function device acquired in S62 as the model information 106 and firmware version information 108 of the new combination information. Further, the controller 12 writes all the response information 110 to 116 included in the specific combination information specified in S64 as the response information 110 to 116 of the new combination information. Next, the controller 12 specifies the object information types (the types indicated by "O") that the administration device 10 can acquire among the response information 110 to 116 included in the new combination information. Next, the controller 12 sequentially sends Get commands each including one OID for all the types of specified object information. The administration device 10 can acquire the types of object information to which the specific multi-function device can respond. Since the specific multi-function device having the old version firmware naturally cannot respond to the object information types (the types indicated by "x") that the administration device 10 cannot acquire among the response information included in the new combination information, the controller 12 omits the request therefor. In S72 of FIG. 9, all the types of object information are sequentially requested. Here, by contrast, requests can be omitted. In a case where the object information can be acquired, by means of the processes, for the types indicated by "O" in the response information 110 to 116 in the new combination information, the controller 12 maintains the response information corresponding to those types as "O" and, in a case where the object information can not be acquired, changes the response information corresponding to those types to "x". Upon ending these processes, the controller 12 continues to S88.

The phrase "the first acquisition unit may be configured to sequentially acquire an M1 type of object information from the first device by sequentially making requests to the first device for N1 types of object information" may be rephrased as, e.g., "the first acquisition unit may be configured to sequentially acquire an M1 type of object information from the first device by sequentially sending N1 request packets to the first device".

The phrase "the second acquisition unit may be configured to send, when making requests to the first device and the second device for the M1 types of object information, one request packet which includes at least two sets of object identification information corresponding to at least two types of object information among the M1 types of object information" does not only mean the second acquisition unit sends only one request packet to make a request for the M1 types of object information to the first device and the second device; the above description also includes the request for the M1 types of object information being made to the first device and the second device by the second acquisition unit sending two or more request packets (each request packet including at least two sets of object identification information).

The "control program" may be also termed, e.g., an "application program for acquiring the object information".

What is claimed is:

1. An administration device configured to be connected in a communicable manner with a first device and a second device, the administration device comprising:
a controller configured to operate as:
a first acquisition unit configured to sequentially acquire a first number (M1) of types of object information from the first device by sequentially making requests to the first device for a second number (N1) of types of object information, wherein each of the M1 types of object information is a part of the N1 types of object information, the N1 is an integer equal to or greater than 2, and the M1 is an integer equal to or greater than 1 and is less than the N1; and
a second acquisition unit configured to newly acquire the M1 types of object information from the first device, after the first acquisition unit has sequentially acquired the M1 types of object information, by making a request to the first device for the M1 types of object information that can be acquired from the first device, without sequentially making requests to the first device for the N1 types of object information,
wherein, in a first case where model information of the second device matches model information of the first device, the second acquisition unit further acquires the M1 types of object information from the second device by making a request to the second device for the M1 types of object information that can be acquired from the first device, without sequentially making requests to the second device for the N1 types of object information.

2. The administration device as in claim 1, wherein
in a case where the M1 is an integer equal to or greater than 2, the second acquisition unit sends, when making the request to each of the first device and the second device for the M1 types of object information, one request packet which includes at least two sets of object identification information corresponding to at least two types of object information among the M1 types of object information.

3. The administration device as in claim 1, wherein the controller is further configured to operate as:
a basic information acquisition unit configured to acquire the model information of the first device and the model information of the second device; and
a judging unit configured to judge (a) whether the model information of the first device matches the model information of the second device.

4. The administration device as in claim 3, wherein
the basic information acquisition unit further acquires firmware version information of the first device and firmware version information of the second device,
the judging unit further judges (b) whether the firmware version information of the first device matches the firmware version information of the second device, and
the first case is a case where the model information of the second device matches the model information of the first device, and the firmware version information of the first device matches the firmware version information of the second device.

5. The administration device as in claim 4, wherein
in a case where the model information of the first device matches the model information of the second device, and the firmware version information of the second device is newer than the firmware version information of the first device:
the first acquisition unit sequentially acquires an eighth number (M5) of types of object information among a ninth number (N4) of types of object information from the second device by sequentially making a request to the second device for the N4 types of object information among the N1 types of object information, wherein none of the N4 types of object information is included in the M1 types of object information that can be acquired from the first device, the N4 is an integer equal to or greater than 1, and the M5 is an integer equal to or greater than 1 and is equal to or less than the N4; and
the second acquisition unit newly acquires the M1 types of object information and the M5 types of object information from the second device, after the first acquisition unit has sequentially acquired the M5 types of object information, by making a request to the second device for each of the M1 types of object information that can be acquired from the first device and for each of the M5 types of object information that can be acquired from the second device.

6. The administration device as in claim 1, wherein
in a second case where the model information of the second device does not match the model information of the first device:
the first acquisition unit sequentially acquires a third number (M2) of types of object information from the second device by sequentially making requests to the second device for the N1 types of object information, wherein each of the M2 types of object information is a part of the N1 types of object information, and the M2 is an integer equal to or greater than 1 and is less than the N1; and
the second acquisition unit newly acquires the M2 types of object information from the second device, after the first acquisition unit has sequentially acquired the M2 types of object information, by making a request to the second device for the M2 types of object information that can be acquired from the second device, without sequentially making requests to the second device for the N1 types of object information.

7. The administration device as in claim 1, further comprising:

a program storage unit configured to store a control program for controlling a performance of the administration device, wherein the first acquisition unit sequentially acquires the M1 types of object information from the first device by sequentially making the requests to the first device for the N1 types of object information, the N1 types of object information corresponding to an ability of a first control program stored in the program storage unit, wherein, in a case where the first control program has been upgraded to a second control program:

the first acquisition unit sequentially acquires a fourth number (M3) of types of object information from the first device by sequentially making requests to the first device for a fifth number (N2) of types of object information, wherein the N2 types of object information corresponds to an ability of the second control program, the M3 types of object information are a part of the N2 types of object information, the N2 is an integer equal to or greater than 2, and the M3 is an integer equal to or greater than 1 and is less than the N2; and the second acquisition unit newly acquires the M3 types of object information from the first device, after the first acquisition unit has sequentially acquired the M3 types of object information, by making a request to the first device for each of the M3 types of object information that can be acquired from the first device, without sequentially making requests to the first device for the N2 types of object information.

8. The administration device as in claim 1, further comprising:

a program storage unit configured to store a control program for controlling a performance of the administration device, wherein, the first acquisition unit sequentially acquires the M1 types of object information from the first device by sequentially making requests to the first device for the N1 types of object information, the N1 types of object information corresponding to an ability of a first control program stored in the program storage unit, wherein, in a case where the first control program has been upgraded to a second control program:

the first acquisition unit sequentially acquires a sixth number (M4) of types of object information among a seventh number (N3) of types of object information from the first device by sequentially making a request to the first device for the N3 types of object information among N2 types of object information, wherein the N2 types of object information corresponds to an ability of the second control program, none of the N3 types of object information is included in the N1 types of object information, the N2 is an integer greater than the N1, the N3 is an integer equal to or greater than 1, and the M4 is an integer equal to or greater than 1 and is equal to or less than the N3; and the second acquisition unit newly acquires the M1 types of object information and the M4 types of object information from the first device, after the first acquisition unit has sequentially acquired the M4 types of object information, by making a request to the first device for each of the M1 types of object information that can be acquired from the first device and for each of the M4 types of object information that can be acquired from the first device, without sequentially making requests to the first device for the N2 types of object information and the N3 types of object information.

9. A non-transitory computer readable medium including a computer program for an administration device configured to be connected in a communicable manner with a first device and a second device, the computer program including instructions for ordering a computer mounted on the administration device to execute:

a first acquisition process that sequentially acquires a first number (M1) of types of object information from the first device by sequentially making requests to the first device for a second number (N1) of types of object information, wherein each of the M1 types of object information is a part of the N1 types of object information, the N1 is an integer equal to or greater than 2, and the M1 is an integer equal to or greater than 1 and is less than the N1; and a second acquisition process that newly acquires the M1 types of object information from the first device by making a request to the first device for the M1 types of object information that can be acquired from the first device, without sequentially making requests to the first device for the N1 types of object information, wherein, in a first case where model information of the second device matches model information of the first device, the second acquisition process includes further acquiring the M1 types of object information from the second device by making a request to the second device for the M1 types of object information that can be acquired from the first device, without sequentially making requests to the second device for the N1 types of object information.

* * * * *